(12) United States Patent
 Chari

(10) Patent No.: US 9,794,143 B1
(45) Date of Patent: Oct. 17, 2017

(54) VIDEO DELIVERY OVER IP PACKET NETWORKS

(75) Inventor: Santhana Chari, Mableton, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 485 days.

(21) Appl. No.: 13/616,118

(22) Filed: Sep. 14, 2012

(51) Int. Cl.
*H04L 12/26* (2006.01)
*H04L 12/841* (2013.01)
*H04L 12/725* (2013.01)

(52) U.S. Cl.
CPC ............ *H04L 43/08* (2013.01); *H04L 45/302* (2013.01); *H04L 47/283* (2013.01)

(58) Field of Classification Search
CPC .. H04N 7/50; H04N 7/26335; H04N 7/26707; H04N 7/26946; H04N 7/26244
USPC ............ 375/240.25; 370/395.52, 395.2, 229, 370/443; 348/387.1
See application file for complete search history.

(56) References Cited

U.S. PATENT DOCUMENTS

| | | | | |
|---|---|---|---|---|
| 7,411,971 B2* | 8/2008 | Freytsis | ................... | H04L 47/50 370/235 |
| 7,436,454 B2* | 10/2008 | Yamaguchi et al. | ....... | 348/387.1 |
| 8,537,694 B2* | 9/2013 | Ilan | ......................... | H04L 47/10 370/252 |
| 8,582,456 B2* | 11/2013 | Singh | ...................... | H04L 69/32 370/252 |
| 2002/0064128 A1* | 5/2002 | Hughes et al. | ................ | 370/229 |
| 2004/0237122 A1* | 11/2004 | Yamaguchi | ........... | H04L 1/1854 725/136 |
| 2007/0201481 A1* | 8/2007 | Bhatia et al. | .............. | 370/395.2 |
| 2010/0284420 A1* | 11/2010 | Limb et al. | .................... | 370/443 |
| 2011/0167147 A1* | 7/2011 | Andersson | .......... | H04L 43/0858 709/224 |
| 2011/0292996 A1* | 12/2011 | Jayant | .................... | H04N 19/00 375/240.03 |
| 2012/0063462 A1* | 3/2012 | Hu | .................... | H04N 21/23608 370/394 |
| 2012/0082076 A1* | 4/2012 | Kim | ............... | H04N 21/234327 370/310 |
| 2012/0224483 A1* | 9/2012 | Babiarz | ............... | H04L 43/0847 370/232 |

\* cited by examiner

*Primary Examiner* — Neil Mikeska
(74) *Attorney, Agent, or Firm* — Stewart M. Wiener

(57) ABSTRACT

Systems and methods can operate to deliver video information over IP networks on a best-effort basis. Best-effort implies that information is delivered without any guaranteed quality of service. During the encoding of video transport streams into video frames, a decoding time stamp (DTS) can be generated that can be used by a video decoder to determine when to begin decoding the video frame data. Information from one or more video frames can be encapsulated in an IP packet. Using the DTS, video encoding rate and video frame size, a time constraint value can be calculated and can provide an indication of the relative transmission priority for the best-effort IP delivery of IP packets containing encapsulated video information.

19 Claims, 5 Drawing Sheets

VIDEO DELIVERY OVER IP PACKET NETWORKS

RELATED APPLICATIONS

Technical Field

This disclosure relates to systems and methods for delivery of video information through internet protocol (IP) networks.

Background

With the increased bandwidth available in today's IP networks the delivery of video over IP networks is growing. IP networks and/or access networks can deliver digital video streams on a "best effort" basis to users. Best-effort implies that the network may not guarantee a specified delivery rate or a delivery time for data including video content. During periods of high network usage a user accessing a video stream may experience a poor quality of experience (QoE).

A digital video stream can be encoded using media picture experts group (MPEG) and the companion H.264 standards. Encoded video can be encapsulated into a transport stream such as MPEG2, QuickTime, Flash and Silverlight and can be further encapsulated for transmission in an IP network. QuickTime uses an encapsulation format from Apple, Inc. of Cupertino, Calif. Flash uses an encapsulation format from Adobe Systems, Inc. of San Jose, Calif. Silverlight uses an encapsulation format from Microsoft, Inc. of Redmond, Wash.

BRIEF DESCRIPTION OF THE DRAWINGS

Like reference numbers and designations in the various drawings indicate like elements.

DETAILED DESCRIPTION

In some implementations of this disclosure, methods, systems, and apparatuses can generate and/or deliver video streams to customer premise device(s) (CPE) through IP and access networks. Digital video streams can include timing information for each video frame. The timing information can include a decoding time stamp (DTS). During the encoding process of a digital video stream by a video encoder/transcoder, the encoder/transcoder can determine a relative transmission priority based on the decoding time stamp (DTS), encoded size and a transmission rate for a video frame. In some implementations, a relative transmission priority can be calculated and included in the header of one or more IP packets that can be used to encapsulate and deliver digital video frames. The relative transmission priority can be used by network elements in the IP and access networks to manage the delivery of digital video streams while optimizing a user's QoE under the network constraints.

Figure 1:
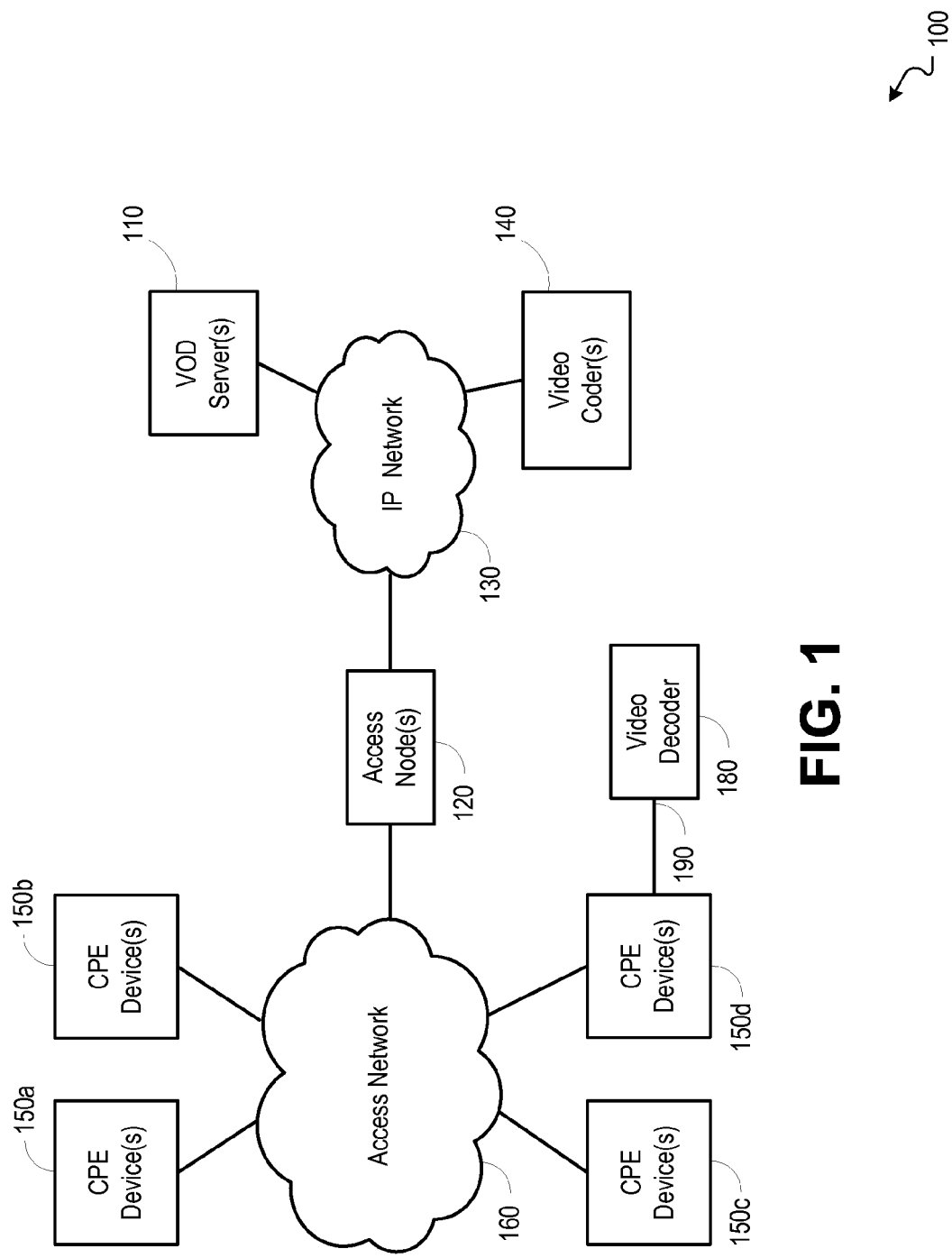
FIG. 1 is a block diagram illustrating an example network environment operable to encode and/or deliver a digital video stream.

FIG. 1 is a block diagram illustrating an example network environment operable to encode/transcode and/or deliver a digital video stream. In some implementations, one or more video on demand (VOD) server(s) 110 can provide video content to one or more access node(s) 120 through IP network 130. Additionally, one or more video coders 140 can also provide video content to access node(s) 120. In other implementations, VOD server(s) 110 and video coders 140 can deliver a video transport streams directly to access node 120 (not shown).

Access nodes(s) 120 can aggregate one or more IP video streams for delivery to client device(s) 150*a-d* through access network 160. Access node(s) 120 can be a DOCSIS cable modem termination system (CMTS), digital subscriber line access multiplexer (DSLAM), mobile cellular base station, wireless access point or optical line terminal (OLT). Access network 160 can be a DOCSIS based Hybrid-Fiber Coax network, digital subscriber loop (DSL), mobile cellular network (e.g., 3G, 4G, LTE, etc.), wireless network (e.g., 802.11, 802.16, etc.), fiber to the curb (FTTC), fiber to the premise (FTTP) network or other broadband access network. CPE device(s) 150*a-d* can be a DOCSIS cable modem (CM)/enhanced terminal media adapter (eMTA), set top box, optical network unit (ONS), DSL modem, cellular phone, personal computer/tablet. Client device(s) 150*a-d* can also include a local interface 170 that can forward IP video streams to one or more external devices 180. The local interface 190 can be based on the Multimedia over Coax Alliance (MoCA), 802.11, Ethernet, universal serial bus (USB), G.hn specifications, or other home networking specifications.

Figure 2:
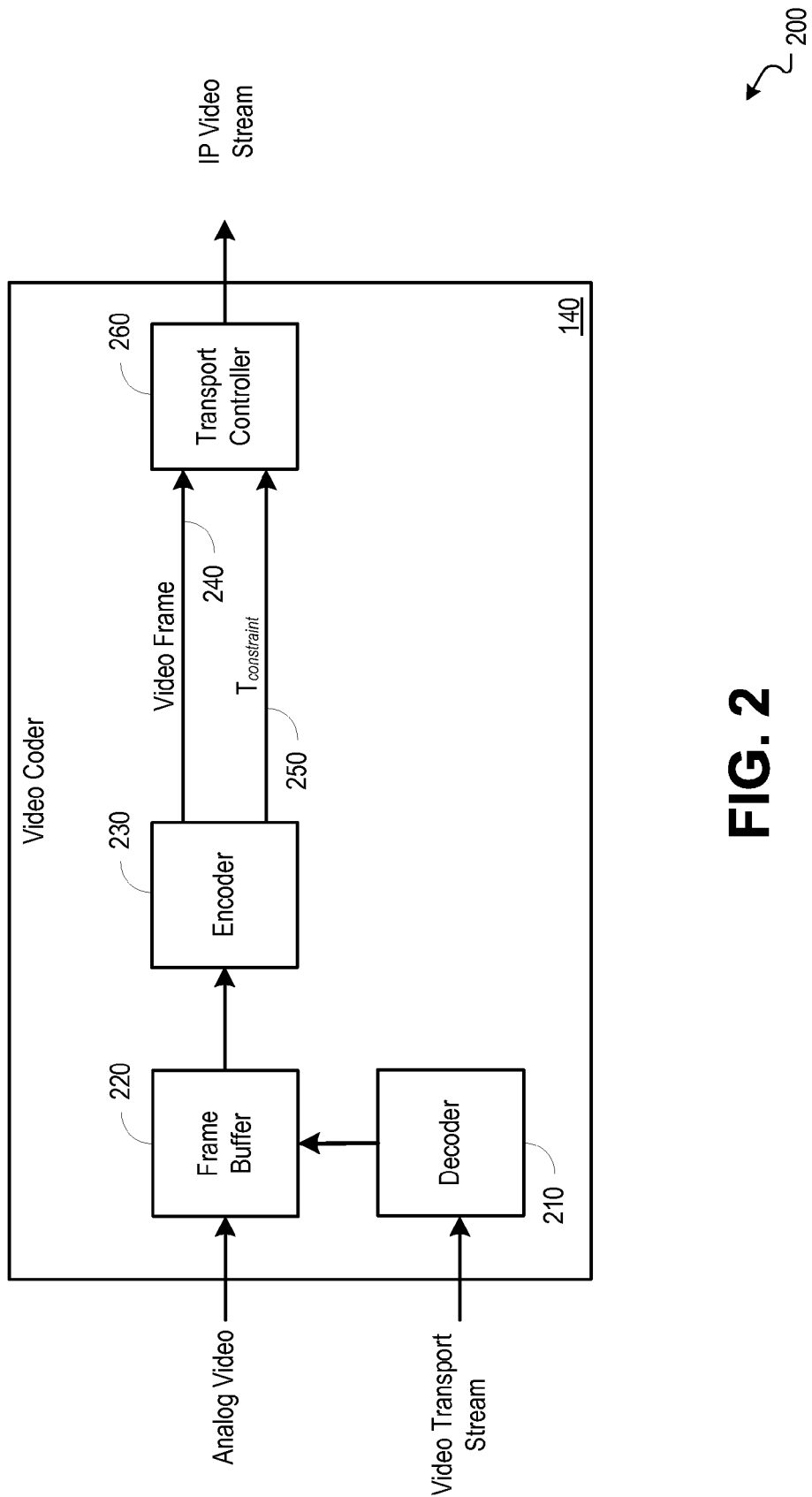
FIG. 2 is a block diagram illustrating an example video coder operable to provide an IP digital video stream with transmission priority.

FIG. 2 is a block diagram illustrating an example video coder operable to provide an IP video stream with transmission priority. In some implementations, the video coder 140 can include a decoder 210, frame buffer 220, encoder 230 and transmit controller 260.

In some implementations, the video coder 140 can have one or more inputs for receiving analog video to perform video encoding. In other implementations the video coder can have one or more inputs for receiving digital video streams to perform video transcoding. In yet other implementations the video encoder can have one or more inputs for receiving both analog video and digital video streams to perform video encoding and transcoding.

In some implementations, decoder 210 can decode a digital video stream received by the video coder 140 and can generate an analog video output. In some implementations, the frame buffer 220 can receive an analog video stream from the input of the video encoder for buffering on a per frame basis. In other implementations, the frame buffer 220 can receive an analog video stream from decoder 210 for buffering on a per frame basis. In still other implementations, and frame buffer can receive an uncompressed digital video stream from either the input of the video encoder or the decoder 210 for buffering on a per frame basis.

In some implementations, encoder 230 can receive analog or digital video from frame buffer 220 and can encode the video using encoding formats such as MPEG2/H.264. The encoded video can be synchronized and multiplexed with other elementary streams such as audio, program and system information protocol (PSIP), enhanced TV binary interchange data format (EBIF) and encapsulated into a digital video stream. Alternate formats of video transport stream encapsulation based on MPEG4 are used by QuickTime, Flash and Silverlight.

The encoder 230 can also add timing information to the digital video stream for subsequent decoding and can include a program clock reference (PCR), presentation time stamp (PTS), and decoding time stamp (DTS). The PCR can be used by encoder 230 and can provide a system timing clock. The PTS can provide synchronization of the video, audio and subtitle elementary streams. A digital video stream can include multiple video frames each with an associated DTS. Additionally a video frame can include multiple video transport packets. The DTS can inform the video decoder of the time at which that video frame needs to be decoded for subsequent display.

In some implementations, encoder 230 can calculate an approximate time of transmission (Ttx) for each video frame based on the video frame size, encoding rate, transmission rate and the buffer model constraints imposed by the encoding standard such as MPEG-2 or H.264. Additionally, the encoder 230 can calculate a time margin ($T_{margin}$) associated with a video frame where $T_{margin}=DTS-T_{tx}$ representing a time constraint for transmission of the video frame.

Transport controller 260 can receive a video frame 250 from encoder 230. The transport controller can encapsulate video transport packets associated with video frame 250 in one or more packets. In some implementations, IP based packets can be used. In other implementations other packet based protocols can be used. The transport controller 260 can receive a time constraint 250 for each video frame 240 that can be included in the IP packets used to encapsulate the video frame. Since one or more IP packets may be used to encapsulate a video frame each IP packet will contain the same time constraint value. In some implementations, the encapsulation of video transport packets in an IP packet can be restricted to only those video transport packets associated with a unique video frame. While other implementations, video transport packets from two video frames can be encapsulated in the same IP packet. In this case one or more video frames can be buffered by transport controller 260 and the IP packet can be populated with the most stringent of the two time constraint values.

In some implementations, the transport controller 260 can be implemented in video encoders, video transcoders and/or video encoders/transcoders (e.g., video coder 140 of FIG. 1). In other implementations the transport controller can be implemented in VOD server(s) (e.g., VOD server(s) 110 of FIG. 1) where the video frames with time constraint values are stored and/or generated.

In some implementations, the time constraint value (i.e., $T_{margin}$) can be normalized to one of a plurality of defined time constraint values Tnominal_1 to Tnominal_n to minimize the processing overhead by network elements of the IP network (e.g., IP network 130 of FIG. 1), access node(s) (access node(s) 120 of FIG. 1) and/or CPE device(s) (e.g., CPE device(s) 150a-d of FIG. 1) performing IP packet classification, priority based forwarding and/or processing.

The time constraint value can be embedded in the IP header of the IP video packet to minimize the overhead of deep packet inspection by the network elements of the IP network (e.g., IP network 130 of FIG. 1), access node(s) (e.g. access node(s) 120 of FIG. 1) and/or CPE device(s) (e.g., CPE device(s) 150a-d of FIG. 1 to retrieve the time constraint value. In some implementations, the time constraint value can be included in the type of service (ToS)/differentiated services code point (DSCP) bits of the IP header. Additionally, the IP packet can also include a unique identifier allowing the classification of an IP packet as an IP encapsulated digital video stream with a time constraint value. In some implementations, a transport layer port number can be used to provide identification of an IP encapsulated digital video stream packet with a time constraint value.

Network elements of an IP network (e.g., IP network 130 of FIG. 1) can introduce delay jitter in the transport of IP packets encapsulating a digital video stream with a time constraint value subsequently referred to as IP video packets. In some implementations, where a network element knowingly introduces delay jitter to an IP video packet containing a time constraint value, the network element can modify the time constraint value to indicate a more stringent time constraint prior to forwarding the IP video packet.

Figure 3:
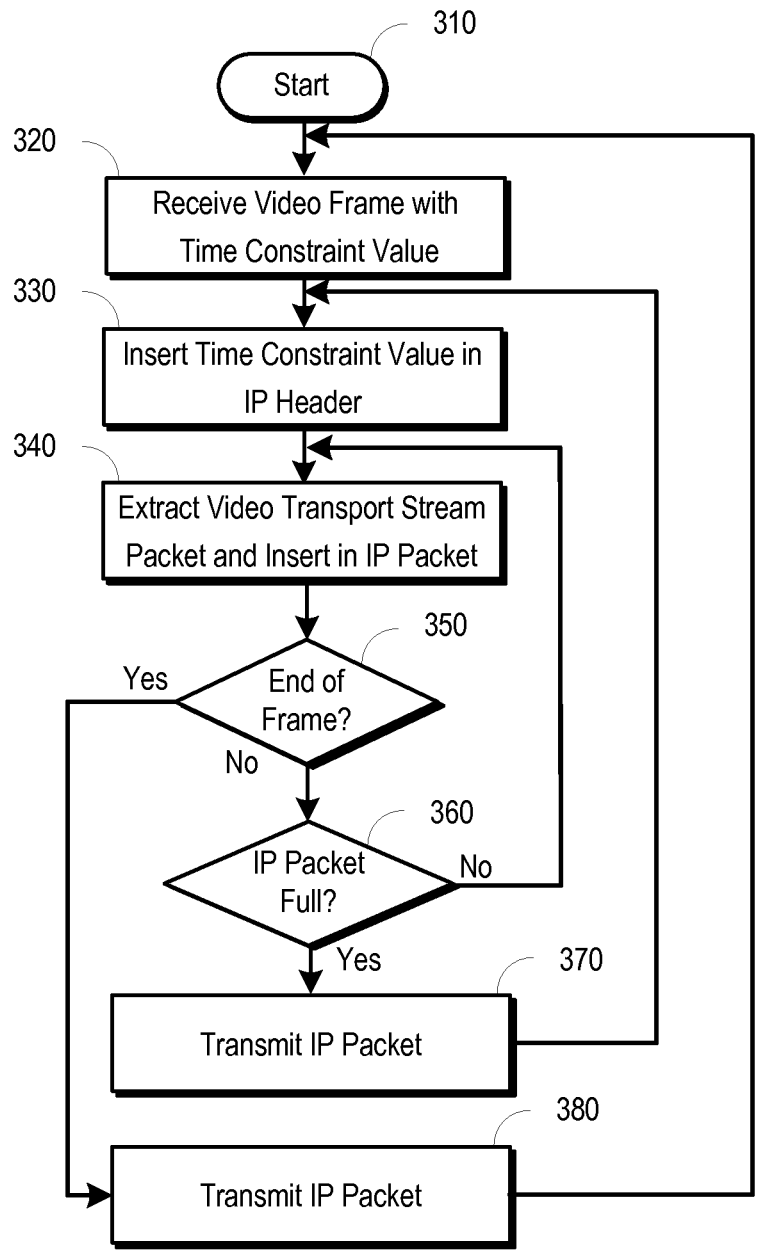
FIG. 3 is a flow chart illustrating an example process generating IP digital video streams with transmission priority.

FIG. 3 is a flow chart illustrating an example process for generating IP digital video streams with transmission priority. The process 300 starts at stage 310. At stage 320, a video frame including a plurality of video transport packets can be received. Additionally, a time constraint value associated with the video frame can be received. The video transport packets can be received, for example, by a transport controller (e.g., transport controller 260 of FIG. 2) at a video coder.

At stage 330, the time constraint value can be inserted in the header of an IP packet. The time constraint value can be inserted in the header of the IP packet, for example, by the transport controller.

At stage 340, data for a video transport packet can be extracted from video frame and inserted in the IP packet. The data for the video transport packet can be extracted from the video frame, for example, by the transport controller.

At state 350, a determination can made if the extracted video transport packet is the last packet of the video frame. The determination can be made, for example, by the transport controller. If it is not the last packet of the video frame, the process 300 proceeds to stage 360. If it is the last packet of the video frame, process 300 proceeds to stage 380.

At stage 360, a determination can made if the IP packet is full. The determination of whether the packet is full can be made, for example, by the transport controller. In some implementations, a packet can be full if it exceeds a specific threshold or portion of the IP packet.

If the IP packet is full, process 300 proceeds to stage 370, where the packet is transmitted. The packet can be transmitted, for example, by the transport controller of the video coder. If the IP packet is not full and can accept additional video transport packets, process 300 returns to stage 340 to continue extracting additional packets from the video frame.

After the IP packet is transmitted at stage 370, the process 300 returns to stage 330 to generate another IP packet for encapsulating the remainder of that frame's video transport packets.

Similarly at stage 380, the IP packet is transmitted. The IP packet can be transmitted by the transport controller of the video coder. After transmission of the IP packet at stage 380, the process 300 returns to stage 320 to await the reception of the next video frame.

Figure 4:
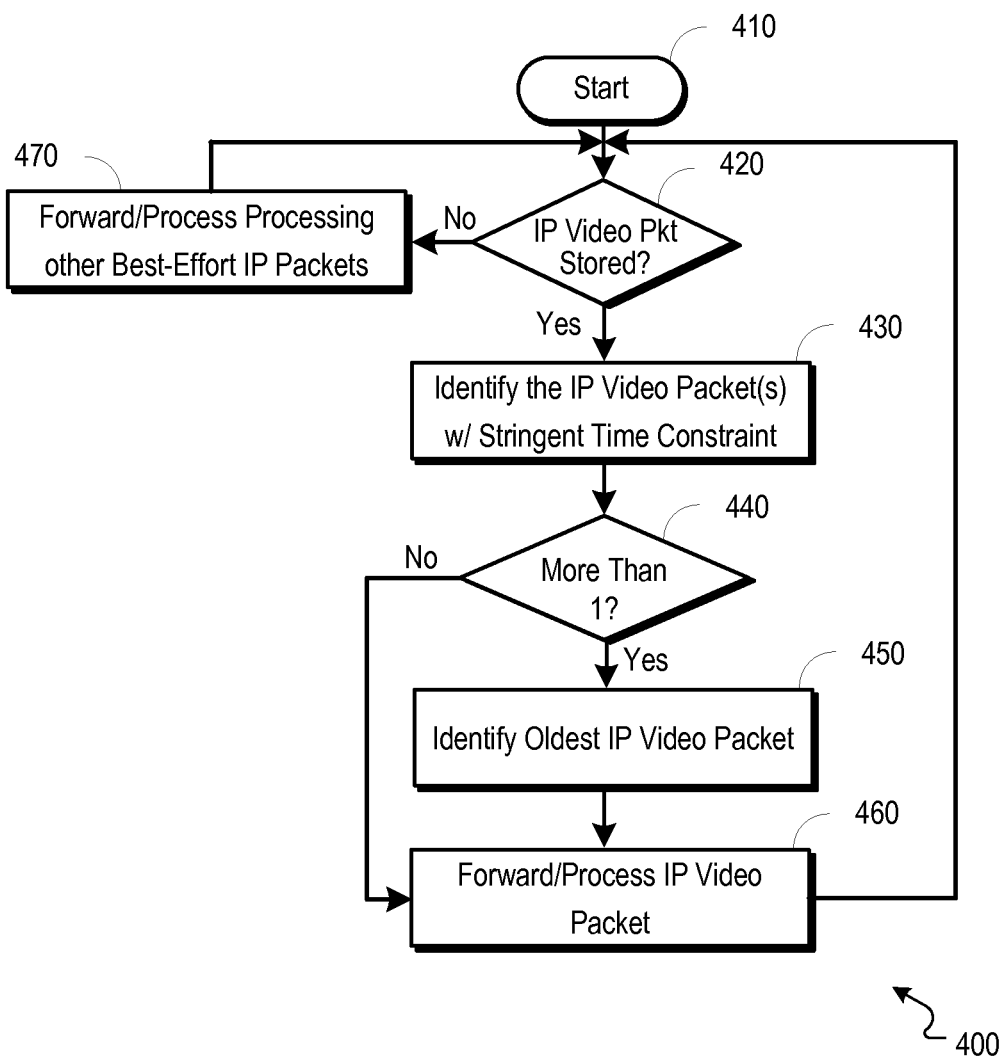
FIG. 4 is a flow chart illustrating an example process for forwarding and/or processing IP digital video streams with transmission priority.

FIG. 4 is a flow chart illustrating an example process for forwarding and/or processing best-effort IP digital video streams with transmission priority. The process 400 begins at stage 410. Network elements in the IP network (e.g., IP network 130 of FIG. 1, access node (e.g., access node 120 of FIG. 1) and CPE device(s) (e.g., CPE devices 150a-d of FIG. 1) can receive multiple IP digital video streams and can use the time constraint to prioritize the forwarding and/or processing (i.e., video decoding) of the IP video packets.

At stage 420, a determination can be made if any IP video packets have been received and stored for forwarding or processing. In some implementations, the IP video packet can be placed in memory. In other implementations, the IP video packets can be enqueued. If no IP video packets are currently stored, process 400 proceeds to stage 470. If IP video packets are currently awaiting processing, then process 400 proceeds to stage 430.

At stage 430, the IP video packet(s) with the most stringent time constraint value is selected. In some implementations, the video packet with the most stringent time constraint can be identified by inspecting and comparing the time constraints associated with the packets. In other implementations, the most stringent time constraint can be identified based upon a normalized time constraint value included in the packet.

At stage 440, a determination can be made if multiple IP video packets were identified having equal stringent time constraint values. If only one IP video packet was identified then process 400 proceeds to stage 460. If multiple IP video packets were identified process 400 proceeds to stage 450.

At stage 450, the identified IP video packet that has been stored or queued for the longest time interval (i.e., oldest) is identified. In some implementations, the IP video packet that has been stored or queued can be identified by comparing the time stamps associated with origination of the packet or time of insertion into the queue. In other implementations, an oldest IP video packet can be flagged or marked, for example, based on location of the packet within the queue.

At stage 460, the identified IP video packet can be handled. In some implementations, the IP video packet will be forwarded. Network elements of the IP network (e.g., IP network 130 of FIG. 1) and access node (e.g., access node 120 of FIG. 1) are typically associated with forwarding IP video packets. Additionally, CPE device(s) (CPE device 150d of FIG. 1) can forward IP video packets to devices attached to a local interface (e.g., local interface 190 of FIG. 1). In other implementations, the IP video packet can be processed (e.g., decoded) for subsequent display by CPE device(s) (e.g., CPE devices 150a-d of FIG. 1).

At stage 470, the forwarding and/or processing of other best-effort IP packets can occur.

Figure 5:
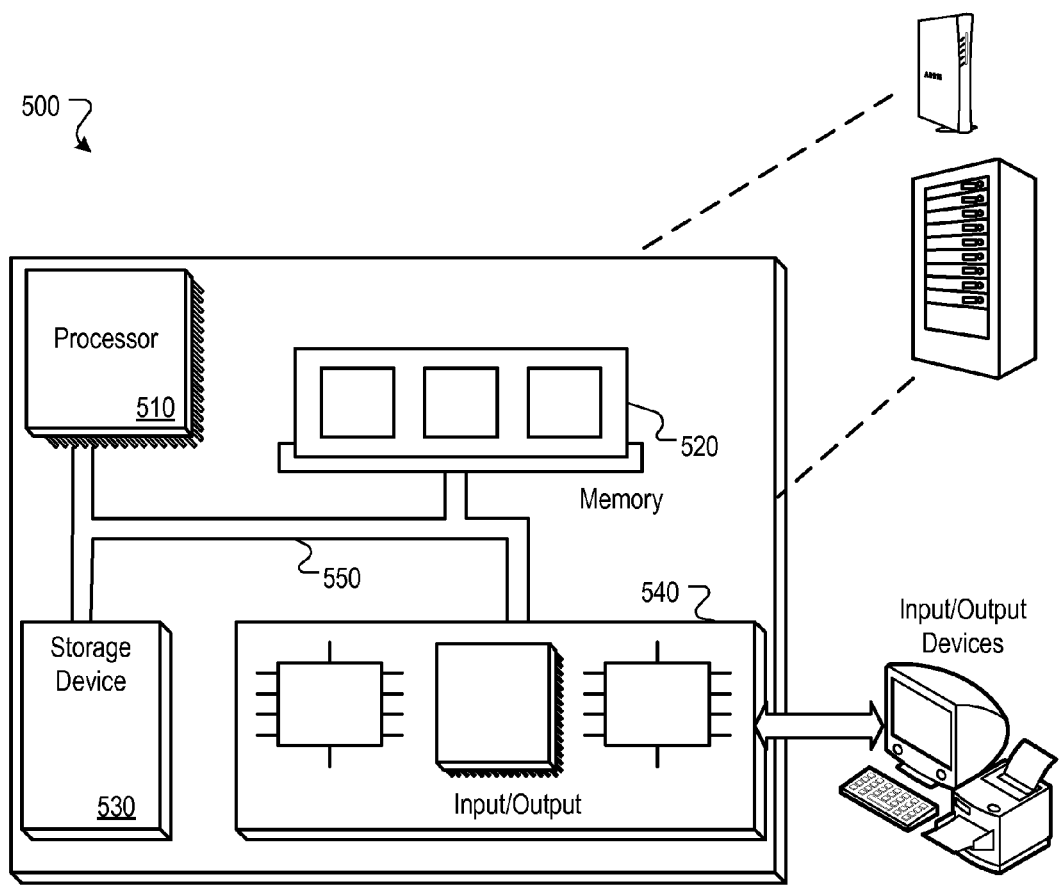
FIG. 5 is a block diagram illustrating an example of a video coder, video-on-demand (VOD) server, IP network element, access node and/or CPE device operable to transmit and/or receive IP digital video streams with transmission priority.

FIG. 5 is a block diagram illustrating a video encoder, video transcoder, video encoder/transcoder, video-on-demand (VOD) server, IP network element, access node and/or CPE device operable to transmit and/or receive IP video streams with transmission priority. System 500 can include a processor 510, a memory 520, a storage device 530, and an input/output device 540. Each of the components 510, 520, 530, and 540 can, for example, be interconnected using a system bus 450. The processor 510 is capable of processing instructions for execution within system 500. In one implementation, the processor 510 is a single-threaded processor. In another implementation, the processor 510 is a multi-threaded processor. The processor 510 is capable of processing instructions stored in the memory 520 or on the storage device 530. The processor 510 can be a complex of one or more processors.

The memory 520 stores information within the system 500. The memory 520 is a computer-readable medium. In various implementations, the memory 520 can include a volatile memory unit, a non-volatile memory unit, or combinations thereof.

In some implementations, the storage device 530 is capable of providing mass storage for system 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the system 500. In one implementation, the input/output device 540 can include one or more interfaces for enabling communication through DOCSIS-based, 3G/4G/LTE, 802.11, 802.16, FTTC, or FTTP access networks. In another implementation, the input/output device can include driver devices configured to receive input data and send output data to other input/output devices, such as one or more computers as well as sending communications to, and receiving communications from a network (not shown). Other implementations, however, can also be used, such as mobile computing devices, mobile communication devices, set-top box television client devices, etc.

The devices (e.g., video encoder, video transcoder, video encoder/transcoder, video-on-demand (VOD) server, IP network element, access node cable modem, set top box, media terminal adapter, mobile phones, tablet computers, personal computers, personal digital assistances, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A system, comprising:
   a video encoder/transcoder communicatively coupled to an access network,
   the video encoder/transcoder comprising one or more special purpose computer processors configured by instructions stored on a non-transitory computer readable medium,
   the video encoder/transcoder configured to generate, based on a plurality of input video frames, a digital video stream comprising a plurality of video frames, and
   the video encoder/transcoder further configured to calculate a time constraint value associated with each of said plurality of video frames;
   a transport controller communicatively coupled to the access network,
   the transport controller comprising one or more special purpose computer processors configured by instructions stored on a non-transitory computer readable medium,
   the transport controller configured to receive the plurality of video frames and the associated time constraint values, and
   the transport controller further configured to encapsulate the digital video stream in a plurality of internet protocol (IP) packets, wherein the time constraint value associated with each of the plurality of video frames is included in each of the IP packets; and
   one or more network elements communicatively coupled to the access network, the one or more network elements each comprising one or more special purpose computer processors configured by instructions stored on a non-transitory computer readable medium, and configured to receive, via the access network, a plurality of digital video streams including the digital encapsulated digital video stream, the plurality of digital video streams each including IP packets comprising time constraints in the headers of the respective IP packets, the time constraints being generated by respective video encoder/transcoders responsible for originating the corresponding digital video stream, the one or more network elements being further configured to perform a relative transmission prioritization by:

processing the IP packets for the plurality of digital video streams based upon the time constraints included in the headers of the respective IP packets, and modifying the time constraints in the headers of the IP packets of a subset of the plurality of digital video streams, the modifying based upon delay introduced in the one or more network elements, such that a subsequent relative transmission prioritization is enabled in a different network element.

2. The system of claim 1, wherein one or more video transport packets of the digital video stream from a first video frame and a second video frame are encapsulated in the same IP packet and the most stringent time constraint value from one of the first video frame and second video frame is included in the internet protocol packet.

3. The system of claim 1, wherein the time constraint value is based on a decoding time stamp, video frame size, encoding rate, transmission rate and buffer model constraints.

4. The system of claim 1, wherein the time constraint value is normalized to one of a plurality of values.

5. The system of claim 1, wherein the time constraint value is included in an internet protocol packet header of the internet protocol packet.

6. The system of claim 1, wherein the time constraint value is included in differentiated services code point bits of the internet protocol packet header.

7. A method, comprising:
receiving a plurality of digital video frames respectively associated with a plurality of digital video streams and time constraint values respectively associated with the plurality of digital video frames, wherein the time constraint value is based on a decoding time stamp of the video frame;

enabling a relative transmission prioritization based on the time constraint value by inserting the time constraint value in the packet header of one or more internet protocol (IP) packets; and encapsulating data from the video frame in said one or more IP packets.

8. The method of claim 7, wherein the method is performed by one of a video-on-demand server, video encoder, video transcoder, and a video encoder and transcoder.

9. The method of claim 7, wherein the one or more IP packets are transmitted directly to an access node.

10. The method of claim 7, wherein the one or more IP packets are transmitted to an access node through an IP network.

11. The method of claim 10, wherein the access node is one of: a data over cable system interface specification (DOCSIS) cable modem termination system, a digital subscriber line access multiplexer (DSLAM), and an optical line termination (OLT).

12. A method comprising:
receiving a plurality of digital video streams at a network element, each of the plurality of digital video streams comprising a plurality of internet protocol (IP) video packets;

identifying one or more best-effort IP video packets from the plurality of digital video streams, the best-effort IP video packets comprising one or more video transport packets with a time constraint value;

performing a relative transmission prioritization by selecting the oldest best-effort IP video packet with the most stringent time constraint value; and performing one of forwarding and processing of the selected best-effort internet protocol video packet, wherein prior to a forwarding of the best-effort IP video packet, the time constraint value is modified such that a subsequent relative transmission prioritization is enabled at a different network element.

13. The method of claim 12, wherein the method is performed by one of an internet protocol network element, access node and customer premise equipment device.

14. The method of claim 12, wherein the best-effort IP video packets are forwarded on an access network.

15. The method of claim 12, wherein the access network is one of: a data over cable service interface specification (DOCSIS) hybrid fiber-coaxial network, a digital subscriber line (DSL) network, a mobile cellular network, and an optical fiber network.

16. The method of claim 12, wherein the internet protocol video packets are forwarded on an internet protocol network.

17. The method of claim 12, wherein the best-effort IP video packets are forwarded on a local customer premise equipment (CPE) interface.

18. The method of claim 17, wherein the local customer premise equipment interface is based on one of: multimedia over coax alliance (MoCA), Industry of Electrical and Electronics Engineers (IEEE) 802.11, Ethernet, universal serial bus (USB) and G.hn.

19. The method of claim 12, wherein the one or more best-effort IP video packets are identified by a transport layer port number.

\* \* \* \* \*